US008803015B2

(12) United States Patent
Toh

(10) Patent No.: US 8,803,015 B2
(45) Date of Patent: Aug. 12, 2014

(54) BUTTON LIGHTING STRUCTURE AND ELECTRONIC DEVICE

(75) Inventor: Tadamine Toh, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 13/818,384

(22) PCT Filed: Mar. 17, 2011

(86) PCT No.: PCT/JP2011/056365
§ 371 (c)(1),
(2), (4) Date: Feb. 22, 2013

(87) PCT Pub. No.: WO2012/056742
PCT Pub. Date: May 3, 2012

(65) Prior Publication Data
US 2013/0153387 A1    Jun. 20, 2013

(30) Foreign Application Priority Data

Oct. 27, 2010 (JP) ................. 2010-240860

(51) Int. Cl.
*H01H 9/00* (2006.01)
(52) U.S. Cl.
USPC .......................................... 200/314; 200/310
(58) Field of Classification Search
USPC ................................................. 200/310–314
See application file for complete search history.

(56) References Cited

U.S. PATENT DOCUMENTS

| 2010/0108486 A1* | 5/2010 | Yoshida .................. 200/520 |
| 2010/0133083 A1* | 6/2010 | Watanabe et al. ......... 200/5 R |
| 2012/0055770 A1* | 3/2012 | Chen ....................... 200/310 |

FOREIGN PATENT DOCUMENTS

| JP | 02-000117 U | 1/1990 |
| JP | 02-155136 A | 6/1990 |
| JP | 05-153214 A | 6/1993 |
| JP | 09-055143 A | 2/1997 |
| JP | 2000-268664 A | 9/2000 |
| JP | 2001-197254 A | 7/2001 |
| JP | 2005-063887 A | 3/2005 |
| JP | 2005-243253 A | 9/2005 |

(Continued)

OTHER PUBLICATIONS

International Search Report of PCT/JP2011/056365, dated Jun. 14, 2011, English Translation.

(Continued)

*Primary Examiner* — Renee Luebke
*Assistant Examiner* — Ahmed Saeed
(74) *Attorney, Agent, or Firm* — Sughrue Mion, PLLC

(57) ABSTRACT

Provided is a button lighting structure that includes: a plurality of button members (5) arranged in a matrix with intervals; and light-emitting element (6) disposed in the interval of the plurality of button members (5). The button lighting structure includes button cover member (7) including plate-like portion (11) having a plurality of openings (14) into which the plurality of button members (5) is inserted, translucent guide (12) that guides the movement of button members (5) pushed into openings (14), and peripheral wall portion (13) formed along the outer periphery of plate-like portion (11), and configured to irregularly reflect, by plate-like portion (11) and peripheral wall portion (13), light from light-emitting element (6) disposed to face plate-like portion (11). Button member (5) includes translucent sidewall portion (5b) into which the light, that is emitted from light-emitting element (6) and that has passed through guide (12), enters.

7 Claims, 4 Drawing Sheets

(56) References Cited

FOREIGN PATENT DOCUMENTS

| JP | 2006-190598 A | 7/2006 |
| JP | 2007-026837 A | 2/2007 |
| JP | 2009-139762 A | 6/2009 |

OTHER PUBLICATIONS

Communication dated Sep. 24, 2013, issued by the State Intellectual Property Office of the People's Republic of China in corresponding Application No. 201180042313.8.

* cited by examiner (B-B)

BUTTON LIGHTING STRUCTURE AND ELECTRONIC DEVICE

CROSS REFERENCE TO RELATED APPLICATIONS

This is a National Stage of International Application No. PCT/JP2011/056365 filed Mar. 17, 2011, claiming priority based on Japanese Patent Application No. 2010-240860 filed Oct. 27, 2010, the contents of all of which are incorporated herein by reference in their entirety.

TECHNICAL FIELD

The present invention relates to a button lighting structure for lighting a plurality of button members included in an electronic device such as a telephone, and an electronic device that has the button lighting structure.

BACKGROUND ART

As an electronic device, for example, there is known a push-button telephone that has a button lighting structure which includes a plurality of button members arranged in a matrix and configured to light each button member, in other words, a button backlight structure.

As an example of the button lighting structure of this type, there has been disclosed a configuration that lights the button member by irradiating the inside of the button member with light from a light-emitting diode (LED) disposed directly below each button member (e.g., refer to Patent Literature 1).

For example, as shown in FIGS. 1 and 2, the button lighting structure includes: a plurality of button members 105 which are arranged in a matrix; case 103 which includes operation surface portion 111 having a plurality of openings 114 into which button members 105 are inserted; and LED 106 directly disposed below each button member 105. Further, as shown in FIG. 2, the button lighting structure includes: rubber contact 117 having support 117a for supporting the lower end of each button member 105; and circuit board 118 in which a switch element (not shown), pressed by each button member 105, and LED 106 are arranged.

Button member 105 includes top surface portion 105a pressed by a finger, and side wall portion 105b formed around top surface 105a. Button member 105 has an outer peripheral portion made of a color material and an inner peripheral portion made of a transparent resin material. The display portion, such as a numeral or a symbol, of top surface portion 105a is formed by extending a part of the inner peripheral portion to the outer peripheral portion.

In operation surface portion 111 of case 103, guide 112 is integrally formed along the peripheral edge of opening 114 to guide the movement of button member 105 pushed into opening 114. Transparent panel member 120 is disposed in operation surface portion 111 of case 103, and information display sheet 121 is held between operation surface portion 111 and panel member 120.

Rubber contact 117, made of a transparent resin material, is disposed on circuit board 118. Light from LED 106 is transmitted through support 117a of rubber contact 117 to be applied to the inner peripheral portion of button member 105, and reaches the display portion of top surface 105a to light it. A part of the light irregularly reflected by the inner peripheral portion of button member 105 also reaches the display portion to light it.

CITATION LIST

Patent Literature 1: JP05-153214A

SUMMARY OF INVENTION

Problems to be Solved by Invention

As described above, in the button lighting structure related to the present invention, there is one LED corresponding to one button member, and the number of LEDs needs to equal to that of button members. Thus, depending on the number of LEDs, current consumption for lighting the button member increases. It is therefore desirable to reduce the number of LEDs from the standpoint of manufacturing cost reduction and ecology.

Further, in the button lighting structure related to the present invention, the opening for inserting the button member is formed in the case, and the light from the LED and the light irregularly reflected inside the button member reach the inner surface of the case. Because of the color difference of the resin materials which form the case, in the case, reflectance of light from the LED varies, and consequently the light emitting state of the button member varies according to the color of the case. That is, for example, when the case is made of a black resin material, light from the LED, which has reached the inner surface of the case, is absorbed to cause reduction of the luminance of the button member. Thus, when the black case is used, the intensity of the light emitted from the LED must be made relatively higher by increasing the current value supplied to the LED.

Thus, even in the case of the telephones of the same specifications, when the colors of cases are different, to light the button members with uniform luminance, the intensity of the light from the LED must be adjusted by varying a current value supplied to the LED according to the color of the case. This makes the manufacturing process of the telephone cumbersome.

It is therefore an object of the present invention to provide a button lighting structure capable of solving the aforementioned problems of the related art. An example of the object of the present invention is to provide a button lighting structure capable of making luminance of button members uniform by reducing the number of light-emitting elements necessary for lighting a plurality of button members which are arranged in a matrix, and an electronic device.

Solution to Problem

To achieve the object, a button lighting structure according to the present invention includes: a plurality of button members arranged in a matrix with intervals; and a light-emitting element disposed in the interval of the plurality of button members. The button lighting structure includes a button cover member including a plate-like portion having a plurality of openings into which the plurality of button members is inserted, a translucent guide that guides movement of the button members pushed into the openings, and a peripheral wall portion formed along the outer periphery of the plate-like portion, and configured to irregularly reflect, by the plate-like portion and the peripheral wall portion, light from the light-emitting element disposed to face the plate-like portion. The button member includes a translucent sidewall portion into which light, that is emitted from the light-emitting element and that has passed through the guide enters.

An electronic device according to the present invention includes: the button lighting structure of the present invention; and a case having an opening in which a button cover member is disposed.

Effects of Invention

According to the present invention, the luminance of the button members can be made uniform by irregularly reflecting the light from the light-emitting element inside the button cover member to reduce the number of light-emitting elements necessary for lighting the plurality of button members arranged in the matrix.

DESCRIPTION OF EMBODIMENTS

Hereinafter, the specific embodiments of the present invention will be described with reference to the drawings.

Figure 1:
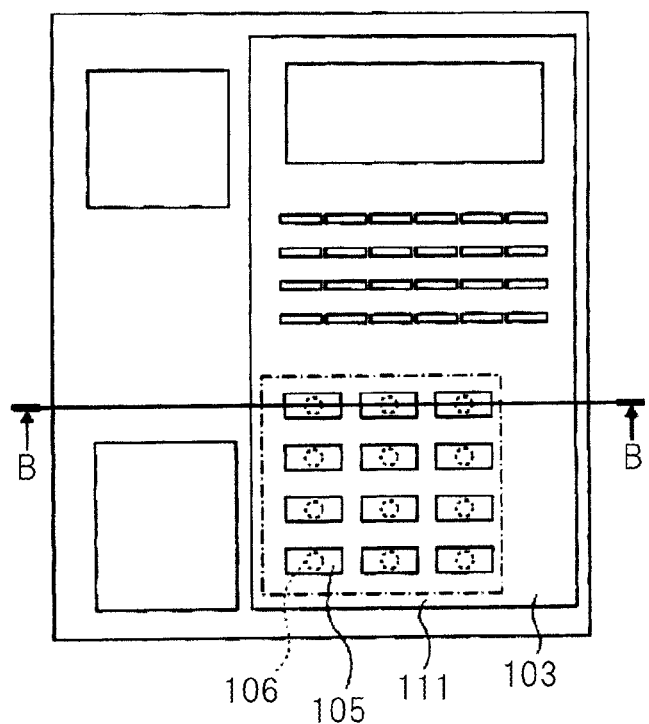
[FIG. 1] A plan view showing a button lighting structure included in a telephone related to the present invention.
Figure 2:
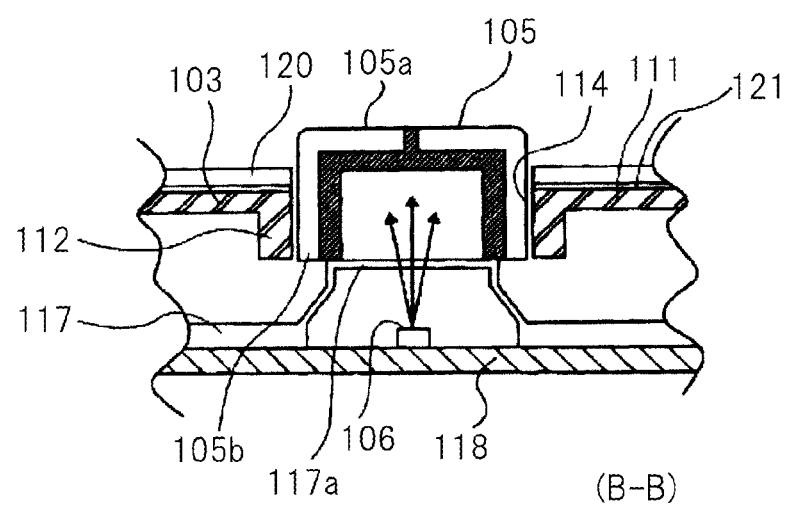
[FIG. 2] A sectional view showing the button lighting structure included in the telephone related to the present invention.
Figure 3:
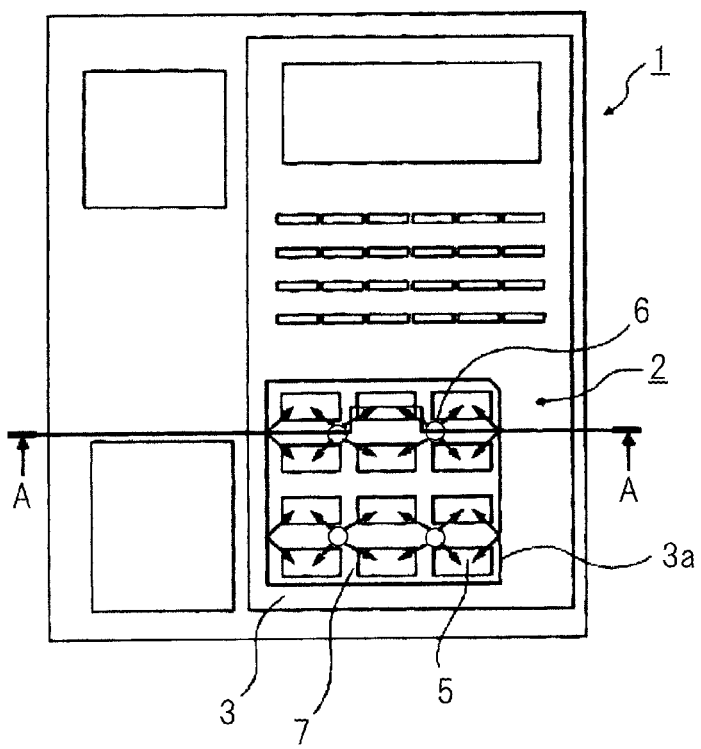
[FIG. 3] A plan view showing a button lighting structure included in a telephone according to an embodiment.
Figure 4:
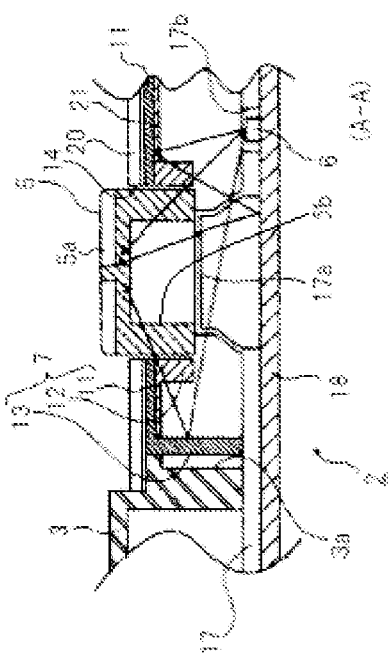
[FIG. 4] A sectional view showing the button lighting structure included in the telephone according to the embodiment.
Figure 5:
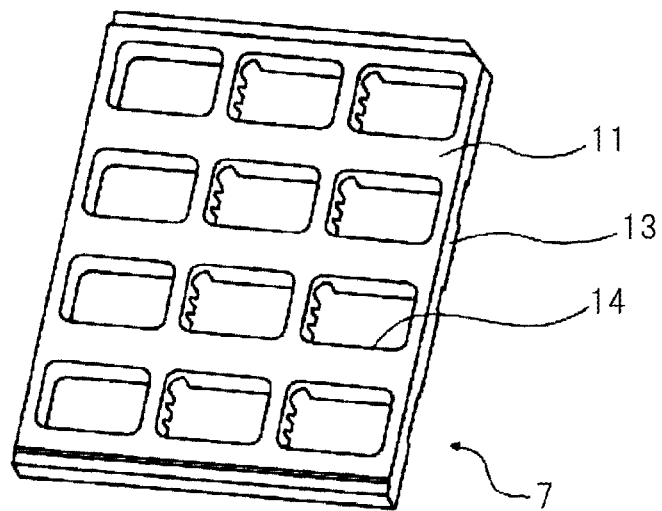
[FIG. 5] A perspective view showing, from the outside, a dial cover included in the button lighting structure according to the embodiment.
Figure 6:
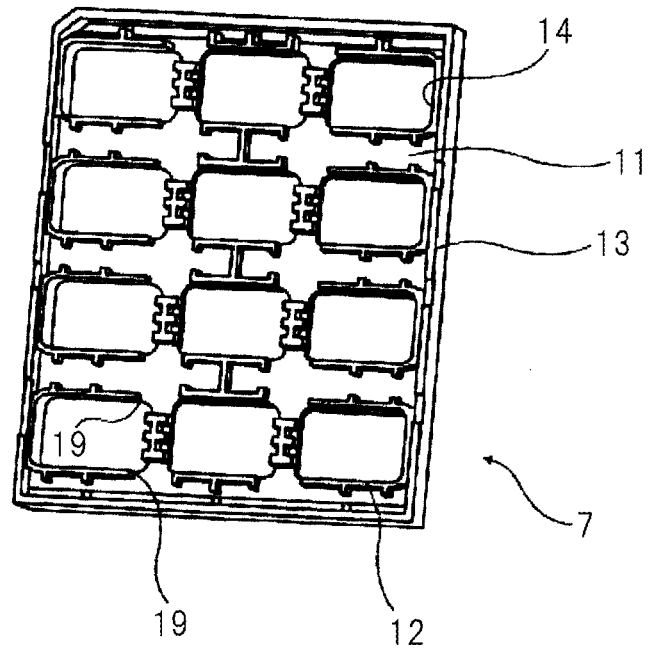
[FIG. 6] A perspective view showing, from the inside, the dial cover included in the button lighting structure according to the embodiment.

FIG. 3 is a plan view showing a button lighting structure included in a telephone according to an embodiment. FIG. 4 is a sectional view showing the button lighting structure included in the telephone according to the embodiment. FIG. 5 is a perspective view showing, from the outside, a button cover member included in the button lighting structure according to the embodiment. FIG. 6 is a perspective view showing, from the inside, the button cover member included in the button lighting structure according to the embodiment.

As shown in FIG. 3, telephone 1 according to the embodiment includes button lighting structure 2 having a plurality of button members, and case 3 in which button lighting structure 2 is disposed. As shown in FIGS. 3 and 4, button lighting structure 2 includes a plurality of button members 5 arranged in a matrix with intervals, and light-emitting element 6 disposed in the interval of the plurality of button members 5.

As shown in FIGS. 4 to 6, button lighting structure 2 includes button cover member 7 including plate-like portion 11 having a plurality of openings 14 into which the plurality of button members 5 is inserted, translucent guide 12 that guides the movement of button members 5 pushed into the openings, and peripheral wall portion 13 formed along the outer periphery of plate-like portion 11. Button cover member 7 irregularly reflects, by plate-like portion 11 and peripheral wall portion 13, light from light-emitting element 6 disposed to face plate-like portion 11.

Button lighting structure 2 includes rubber contact 17 as a button support member for movably supporting button members 5 pushed into openings 14 of button cover member 7, and circuit board 18 in which a switch element (not shown), with which rubber contact 17 that is pushed by button members 5 comes into contact, is disposed.

Button member 5 includes top surface portion 5a pressed by a finger, and side wall portion 5b integrally formed around top surface 5a. Top surface portion 5a is made of a translucent material so that a display portion such as a numeral or a symbol can be lit. Side wall portion 5b is made of a translucent material, into which light output from light-emitting element 6 and having passed through guide 12, is connected to the display portion of top surface portion 5a.

In this embodiment, as shown in FIG. 3, twelve button members 5 are arranged in a matrix, which includes three columns and four rows. In the embodiment, four light-emitting elements 6 are respectively arranged between an uppermost row and its adjacent row and are respectively arranged between the lowest row and its adjacent row, and unsymmetrically arranged closer to peripheral wall portion 13 side of button cover member 7 than the interval between each column on both sides of and a column in the center. In other words, light-emitting elements 6 are unsymmetrically arranged from the center of the cross intervals among four adjacent button members 5 to peripheral wall portion 13 side of button cover member 7.

In other words, the arrangement of button members 5 in this embodiment corresponds to a configuration wherein each of two portions has six button members 5 arranged in a matrix including three columns and two rows, and is arranged up and down. Two light-emitting elements 6 are arranged between the rows, and unsymmetrically from the interval between each column on both sides of and the column in the center to the side of peripheral wall portion 13.

In the embodiment, six button members 5 are arranged in the matrix, which includes three columns and two rows. However, button members 5 are not limited to this arrangement. Needless to say, six button members 5 can be arranged in a matrix including two columns and three rows, and two light-emitting elements 6 can be arranged between the columns, and unsymmetrically from the interval between each row on both sides of and the rows in the center in a vertical direction to peripheral wall portion 13 side. This configuration can provide the same effects as th6]

Guide 12 of button cover member 7 is formed along the peripheral edge of opening 14. Guide 12 includes notch 19 formed to directly apply the light from light-emitting element 6 to side wall portion 5b of button member 5, and light from one light-emitting element 6 can be efficiently entered into four button members 5.

Four light-emitting elements 6 are arranged at desired positions with respect to twelve button members 5, and the light from light-emitting element 6 is irregularly reflected in button cover member 7. Thus, the number of light-emitting elements 6 necessary for lighting button members 5 is reduced, and button members 5 are lit to be uniform in luminance.

The LED is used for light-emitting element 6, and each light-emitting element 6 is disposed at a predetermined position on circuit board 18 with respect to button member 5 as described above.

Button cover member 7 is formed by combining a first member including plate-like portion 11 and peripheral wall portion 13 with a second member including guide 12. The second member is included in the first member.

Button cover member 7 is formed by two-color molding which uses, for example, a white resin material for the first member and a transparent resin material for the second member. This enables button cover member 7 to irregularly reflect the light from light-emitting element 6 effectively by using plate-like portion 11 and side wall portion 13 which were formed into white, thereby efficiently lighting button member 5 with the light from light-emitting element 6.

Case 3 includes opening 3a in which button cover member 7 is disposed, and transparent panel member 20 is disposed over plate-like portion 11 of button cover member 7 fitted in opening 3a and case 3. Information display sheet 21 is held between plate-like portion 11 of button cover member 7 and panel member 20. Case 3 and button cover member 7 fitted in opening 3a of case 3 are arranged on rubber contact 17.

On circuit board 18, light-emitting element 6 is located at a position which faces plate-like portion 11 of button cover member 7. In the surface of circuit board 18 in which rubber contact 17 is located, an irregular reflection film (not shown) for irregularly reflecting the light from light-emitting element 6 is formed. For this irregular reflection film, a white coated film is used.

Rubber contact 17 made of a translucent resin material is disposed on circuit board 18. In rubber contact 17, a plurality of supports 17a for supporting the lower ends of button members 5 is formed to be elastically displaced. Each switch element of circuit board 18 is disposed directly below each support 17a of rubber contact 17. Rubber contact 17 has opening 17b which is formed so that each light-emitting element 6 on circuit board 18 can face plate-like portion 11 of button cover member 7.

The state of lighting the plurality of button members 5 arranged in the matrix in button lighting structure 2 included in telephone 1 thus configured will be described.

In button lighting structure 2, as shown in FIG. 4, a part of the light emitted from light-emitting element 6 passes through guide 2 or side wall portion 5b of button member 5, and reaches top surface portion 5a of button member 5 to light button member 5.

The light emitted from light-emitting element 6 to plate-like portion 11 of button cover member 7 is irregularly reflected by plate-like portion 11, transmitted through guide 12 and support 17a of rubber contact 17, and irregularly reflected by the irregular reflection film formed in one surface of circuit board 18. Then, the light irregularly reflected on circuit board 18 enters into button member 5, and reaches top surface portion 5a of button member 5 to light it.

The light emitted from light-emitting element 6 to support 17a of button cover member 7 passes through support 17a to be applied to peripheral 1 wall portion 13 of button cover member 7. The light applied to peripheral wall portion 13 is irregularly reflected by peripheral wall portion 13, transmitted through guide 12 and side wall portion 5b of button member 5, and then reaches top surface portion 5a of button member 5 to light it.

Further, a part of the light from light-emitting element 6 is transmitted through notch 19 of button cover member 7, and is directly applied to button member 5 to light top surface portion 5a of button member 5.

Thus, as shown in FIG. 3, the light from one light-emitting element 6 is irregularly reflected by the inner surface of button cover member 7, thereby efficiently lighting four adjacent button members 5 arranged around one light-emitting element 6. In this embodiment, twelve button members 5 are uniformly lit, by lights from four light-emitting elements 6.

As described above, button lighting structure 2 of the embodiment includes button cover member 7 which has plate-like portion 11 for irregularly reflecting the light from light-emitting element 6, and peripheral wall portion 13. Thus, the light from light-emitting element 6 can be irregularly reflected efficiently in button cover member 7 to enter into button member 5. As a result, according to the embodiment, the light from light-emitting element 6 can be efficiently used by button cover member 7 which has a relatively simple configuration. According to the embodiment, since light-emitting element 6 is unsymmetrically disposed closer to peripheral wall portion 13 side than the center of the cross interval of four adjacent button members 5, button members 5 can be lit with uniform luminance.

Thus, according to this embodiment, the number of light-emitting elements 6 necessary for lighting the plurality of button members 5, which are arranged in the matrix, can be greatly reduced, and the luminance of button members 5 can be made uniform.

Further, according to this embodiment, since the light from light-emitting element 6 is reflected only in button cover member 7, button members 5 can be lit uniformly irrespective of the color of case 3. As a result, there is no need to adjust the current value supplied to light-emitting element 6 according to the color of case 3, and the manufacturing process of the telephone, in which case 3 of a plurality of colors is used, can be simplified.

The button lighting structure of the present invention is applied to the operation panel of the telephone. Not limited to the telephone, however, the button lighting structure can be suitably used for various buttons included in other electronic devices such as an electronic computer, a keyboard, or a numerical keypad.

The embodiments of the present invention have been described. However, the present invention is not limited to the embodiments. Various changes understandable to those skilled in the art can be made to the configuration and the specifics of the present invention without departing from the scope of the invention.

This application claims priority from Japanese Patent Application No. 2010-240860 filed Oct. 27, 2010, which is hereby incorporated by reference herein in its entirety.

Reference Numerals

1 Telephone
2 Button lighting structure
5 Button member
5b Side wall portion
6 Light-emitting element
7 Button cover member
11 Plate-like portion
12 Guide
13 Peripheral wall portion
14 Opening

The invention claimed is:

1. A button lighting structure comprising:
   a plurality of movable button members arranged in a matrix with intervals;
   a light-emitting element disposed in the interval of the plurality of movable button members; and
   a button cover member that includes a plate-like portion which has a plurality of openings into which the plurality of button members is inserted, a translucent guide that guides movement of the plurality of movable button members pushed into the openings, and a peripheral wall portion formed along an outer periphery of the plate-like portion configured to irregularly reflect, by the plate-like portion and the peripheral wall portion, light from the light-emitting element disposed to face the plate-like portion,
   wherein the plurality of movable button members include a translucent sidewall portion into which the light, that is emitted from the light-emitting element and that has passed through the guide, enters.

2. The button lighting structure according to claim 1, further comprising:
   a translucent button support member for movably supporting the button members which are pushed into the openings; and
   a circuit board in which the light-emitting element and a switch element, with which the button support member that is pushed by one of the plurality of movable button member comes into contact, are arranged, wherein:
   the button support member is disposed on the circuit board; and
   an irregular reflection film for irregularly reflecting the light from the light-emitting element is formed on a surface of the circuit board in which the button support member is disposed.

3. The button lighting structure according to claim 1, wherein the light-emitting element is disposed unsymmetrically from a center of a cross interval of the four button members adjacent to each other to the peripheral wall portion side.

4. The button lighting structure according to claim 1, wherein:
   six of the plurality of movable button members are arranged in the matrix including three columns and two rows; and
   the two light-emitting elements are arranged between the rows and unsymmetrically from intervals between the columns on both sides of and the column in the center to the side of peripheral wall portion.

5. The button lighting structure according to claim 1, wherein the button cover member is formed by combining a first member having the plate-like portion and the peripheral wall portion with a second member having the guide.

6. The button lighting structure according to claim 5, wherein the button cover member is formed by two-color molding using a white resin material for the first member and a transparent resin material for the second member.

7. An electronic device comprising:
   a plurality of movable button members arranged in a matrix with intervals;
   a light-emitting element disposed in the interval of the plurality of button members; and
   a button cover member comprising a plate-like portion which has a plurality of openings into which the plurality of movable button members is inserted, a translucent guide configured to guide a movement of the plurality of movable button members pushed into the openings, and a peripheral wall portion formed along an outer periphery of the plate-like portion configured to reflect, by the plate-like portion and the peripheral wall portion, light from the light-emitting element disposed to face the plate-like portion,
   wherein the plurality of movable button members comprises a translucent sidewall portion into which the light, that is emitted from the light-emitting element, enters, and
   a case having an opening in which the button cover member is disposed.

* * * * *

UNITED STATES PATENT AND TRADEMARK OFFICE
CERTIFICATE OF CORRECTION

PATENT NO. : 8,803,015 B2  Page 1 of 1
APPLICATION NO. : 13/818384
DATED : August 12, 2014
INVENTOR(S) : Tadamine Toh It is certified that error appears in the above-identified patent and that said Letters Patent is hereby corrected as shown below:

In the Specification

Column 4, Line 32: Delete "This configuration can provide the same effects as th6]" and insert
-- This configuration can provide the same effects as the embodiment. --

Signed and Sealed this
Third Day of March, 2015

Michelle K. Lee
*Deputy Director of the United States Patent and Trademark Office*